Patented July 27, 1954

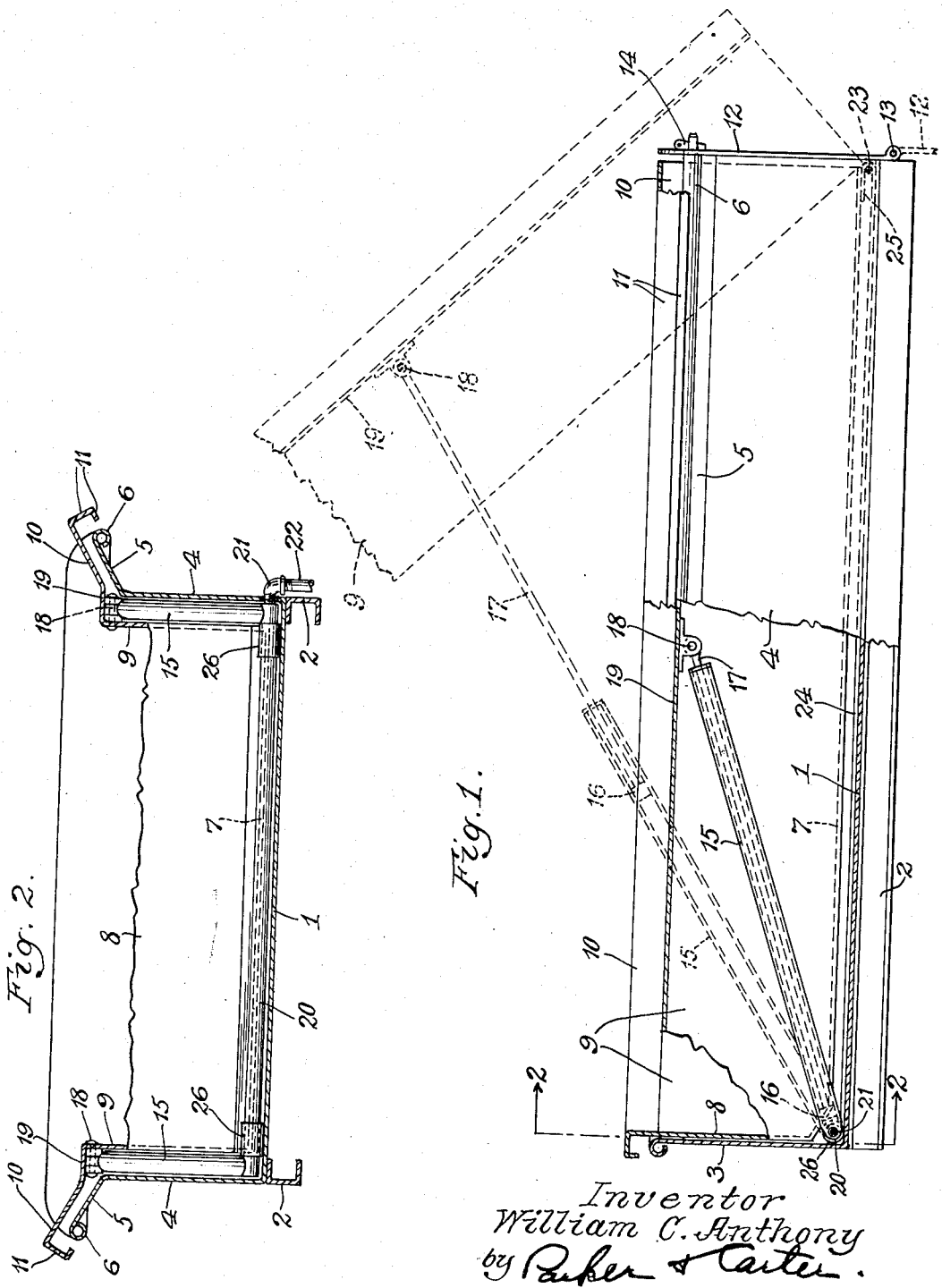

2,684,864

UNITED STATES PATENT OFFICE 2,684,864

BODY TIPPING MEANS

William C. Anthony, Streator, Ill., assignor to Anthony Company, Streator, Ill., a corporation of Illinois Application June 11, 1949, Serial No. 98,608

4 Claims. (Cl. 298—22)

This invention relates to a tipping body assembly. It has for one object to provide such an assembly so arranged that it may readily be mounted within and removed from a fixed body or container.

Another object is to provide a simple unitary or "package" body arranged to be put into or removed from a fixed load carrying body mounted upon a vehicle.

Many trucks and other vehicles are today equipped with fixed load carrying bodies. Generally such bodies cannot readily be re-arranged to provide tipping means. Attempts to accomplish this have proven unsuccessful and generally unsatisfactory. Trucks designed for fixed bodies and the bodies themselves are usually so constructed that it is difficult and expensive to remove the body from the truck to re-arrange it for tipping and to mount tipping means upon the truck. The present invention is intended to avoid this difficulty by providing a complete unit, including the tipping body and the means for tipping it, and to arrange that unit so that it may be readily inserted within a fixed body without any substantial structural changes of that body.

Other objects will appear from time to time throughout the specification and claims.

This invention is illustrated more or less diagrammatically in the accompanying drawings, wherein:

Figure 1 is a side elevation with parts in section and parts broken away.

Figure 2 is a general section taken at line 2, 2 of Figure 1.

Like parts are indicated by like characters throughout the specification and the drawings.

In the particular form shown, 1 designates the floor of a fixed body mounted upon frame members 2, 2. The frame members may be mounted upon a vehicle chassis frame or otherwise. The fixed body includes an end wall 3 and side walls 4, 4. The side walls may conveniently be provided with upwardly flared parts 5 shaped as at 6 to provide curved edges.

The tipping body comprises a member having a bottom 7 and an end wall 8, and having also side walls 9, 9 outwardly flared or directed as at 10 to overlie the corresponding parts 5 of the fixed body. The edges of the portions 10 may be downwardly and inwardly turned as at 11, if desired. Normally the tipping body is not provided with a gate. The gate 12 normally present on the fixed body suffices for closing the tipping body. The gate may be of any desired construction and the particular form here shown is merely illustrative of one suitable gate. As shown, it is hinged at 13 to swing downwardly and it may, in the closed position, be latched as at 14.

The means for tipping the tipping body comprise a pair of cylinders 15, 15. Within each cylinder is mounted a piston 16 to which is attached a piston rod 17. Each piston rod 17 is pivoted as at 18 to a portion 19 of the tipping body. The tipping body is sufficiently smaller than the fixed body to provide, particularly as shown in Figure 2, suitable space within which the piston and cylinder assemblies just described may be positioned.

The two cylinders 15, 15 are in hydraulic circuit with a hollow member 20. This member, as shown particularly in Figure 2 is connected to each of the cylinders 15 and pressure fluid enters the member 20 from a connection 21 to which is joined a conduit 22. Since the member 20 is connected to each of the cylinders 15 pressure fluid entering the member 20 is conducted to each of the cylinders.

The conduit 22 is connected to a source of pressure fluid such as a pump which may be positioned anywhere on the assembly. It may be conveniently positioned near the engine or at any other convenient location upon which the two bodies are mounted. The invention is not limited to any particular pump or pump operating means.

At its rear end the tipping body is provided with a hinge or tipping bearing 23. A straplike member 24 is curved about the hinge 23 as at 25, and is secured to the tipping body. This strap extends forwardly and is curved about the member 20, as shown in Figure 2 at 26. Two such straps will normally be used, one positioned adjacent each side of the tipping body. The member 24 has been referred to as a strap. It may be of any construction and it may be of angular cross section; it may be a channel, an I-beam, or it may be otherwise shaped. It furnishes a hinge for a tipping body or supports that hinge, and it also furnishes a bearing for the member 20.

Although I have shown an operative form of my invention, it will be recognized that many changes in the form, shape and arrangement of parts can be made without departing from the spirit of the invention, and my showing is therefore to be taken as, in a sense, diagrammatic. In particular, the tipping assembly might comprise tipping means and a relatively shallow box or even a flat platform member. Although the device finds an important use in connection with a fixed body or container having side and end walls, it might be assembled upon or mounted upon a flat platform body. Trucks are frequently supplied with fixed platform bodies having stakes instead of sides, and in some cases having neither stakes nor sides. The structure of this invention may be suitably mounted on any sort of fixed container or support.

Where the expression "volume of the tipping body" is used in the specification and claims, it is intended to mean that the tipping means lies within the total space occupied by the tipping body. As shown, the tipping means is under the portions 10 and 11 and below the top and above the bottom of the body. Hence, the tipping means lies broadly within the space occupied by the body but, of course, does not lie within the body.

The use and operation of this invention are as follows:

The device as shown comprises, in effect, a unit which includes the tipping body itself, the hydraulic piston and cylinder assemblies, the connecting conduit member 20, the straps or frame members 24, and the hinge portions above mentioned. It is assembled and may be shipped as a unit, and when desired, is installed in a fixed body. It is made of such size that the assembly fits into a standard fixed load carrying body. The tipping body is shaped to overlap the load carrying body so that material deposited into the tipping body cannot fall upon the fixed body and cannot readily enter the space between the two bodies. Ordinarily, no separate gate is provided for the tipping body. The gate normally provided for the fixed body usually suffices. If desired, a gate may be added to the tipping body. The operation of the device would not be altered by this addition.

To install the device in a fixed body it is necessary only to perforate one wall 4 of the fixed body to permit the insertion of the connection 21. When that perforation or opening has been made, the assembly comprising the tipping body and the tipping mechanism is positioned within the fixed body, the connection 21 is inserted through the perforation and joined to the member 20. The conduit 22 may be connected to a source of pressure fluid and the device is ready for operation.

When the device, after installation, is to be operated pressure fluid is delivered through the conduit 21 into the member 20 and passed into the cylinders 15, thus forcing the pistons from the full line position of Figure 1 to the dotted line position of that figure. As this occurs the tipping body is tipped from the full line position of Figure 1 to the dotted line position of that figure. Stop means, not shown, may be provided to limit the tipping. Pressure relief means may be provided also in the pressure fluid system, if desired.

When the body is to be lowered pressure fluid is allowed to move in the reverse direction from the cylinders 15 to the member 20, and finally through the connection 21 and the conduit 22. Gravity alone is normally sufficient to cause the pressure fluid to be expelled from the cylinders when permitted.

No pump or valve controls are shown because such devices are commonly known on the market. Any pump may be used, and ordinarily there will be associated with such pump valve means or other fluid controlling means so that pressure fluid is at will directed to the cylinders or permitted to be discharged from them.

As indicated in the drawings, the tipping mechanism lies within the side projection of the tipping body. Thus all of the tipping mechanism lies within the projection of the tipping body and substantially all of it lies above the bottom of the tipping body. Therefore, a tipping assembly of the present invention can be designed for low over-all height for the given capacity of load carrying and load tipping. Since the tipping mechanism, as well as the tipping body, is enclosed also within the volume of the fixed body the latter serves as a protection for the tipping mechanism, prevents injury to the tipping mechanism, and prevents injury to operators.

I claim:

1. In combination, in a tipping assembly adapted to be mounted as a unit, within a fixed container, a tipping container and means for tipping it comprising a pair of cylinder and piston assemblies positioned one on each side of said tipping container and spaced apart a distance greater than the width of said tipping container, a member joining said cylinders, a hinge support for said tipping container, and a conduit for pressure fluid connected to said cylinder joining means.

2. In combination, in a tipping assembly adapted to be mounted in a fixed container, a tipping container and means for tipping it comprising a pair of cylinder and piston assemblies positioned one on each side of said tipping container and spaced apart a distance greater than the width of said tipping container, a member joining said cylinders, a hinge support for said tipping container and means joining said hinge support to said cylinder joining member, and a conduit for pressure fluid connected to said cylinder joining means.

3. In combination, in a tipping assembly adapted to be mounted in a container, a tipping container and means for tipping it comprising a pair of cylinder and piston assemblies positioned one on each side of said tipping container and spaced apart a distance greater than the width of said tipping container, a member joining said cylinders, a hinge support for said tipping container and means joining said hinge support to said cylinder joining member at a plurality of points, a conduit for pressure fluid connected to said cylinder joining means.

4. In combination, in a tipping assembly adapted to be mounted in a fixed open-topped container, a tipping container, means for tipping said tipping container, means for pivotally supporting said tipping container, said tipping means comprising a plurality of cylinders mounted one on each side of said tipping container and within said fixed container, said tipping container shaped and proportioned to overlie said fixed container.

References Cited in the file of this patent

UNITED STATES PATENTS

| Number | Name | Date |
|---|---|---|
| Re. 4,212 | Swickard | Dec. 20, 1870 |
| 840,038 | Baskins | Jan. 1, 1907 |
| 1,188,932 | Griffith | June 27, 1916 |
| 1,440,155 | Junkin | Dec. 26, 1922 |
| 1,765,232 | Hug | June 17, 1930 |
| 1,925,296 | Barrett | Sept. 5, 1933 |
| 2,033,209 | Teetor | Mar. 10, 1936 |
| 2,142,089 | Barrett | Jan. 3, 1939 |
| 2,231,242 | Barrett | Feb. 11, 1941 |
| 2,303,033 | Elliott | Nov. 24, 1942 |
| 2,358,224 | Golay | Sept. 12, 1944 |

FOREIGN PATENTS

| Number | Country | Date |
|---|---|---|
| 110,585 | Australia | May 10, 1940 |
| 824,818 | France | Nov. 18, 1937 |
| 701,055 | Germany | Jan. 7, 1941 |